April 8, 1958 C. ABBOTT ET AL 2,829,582
APPARATUS USEFUL IN PAINTING AIRCRAFT
Filed Jan. 18, 1954 7 Sheets-Sheet 2

INVENTORS
CHESTER ABBOTT
GEORGE E. HENDERSON JR.
By *George C. Sullivan*
Agent

April 8, 1958 C. ABBOTT ET AL 2,829,582
APPARATUS USEFUL IN PAINTING AIRCRAFT
Filed Jan. 18, 1954 7 Sheets-Sheet 4

INVENTORS
CHESTER ABBOTT
GEORGE E. HENDERSON JR.
By George C. Sullivan
Agent

April 8, 1958   C. ABBOTT ET AL   2,829,582
APPARATUS USEFUL IN PAINTING AIRCRAFT
Filed Jan. 18, 1954   7 Sheets-Sheet 5

INVENTORS
CHESTER ABBOTT
GEORGE E. HENDERSON JR.
By George C. Sullivan
Agent

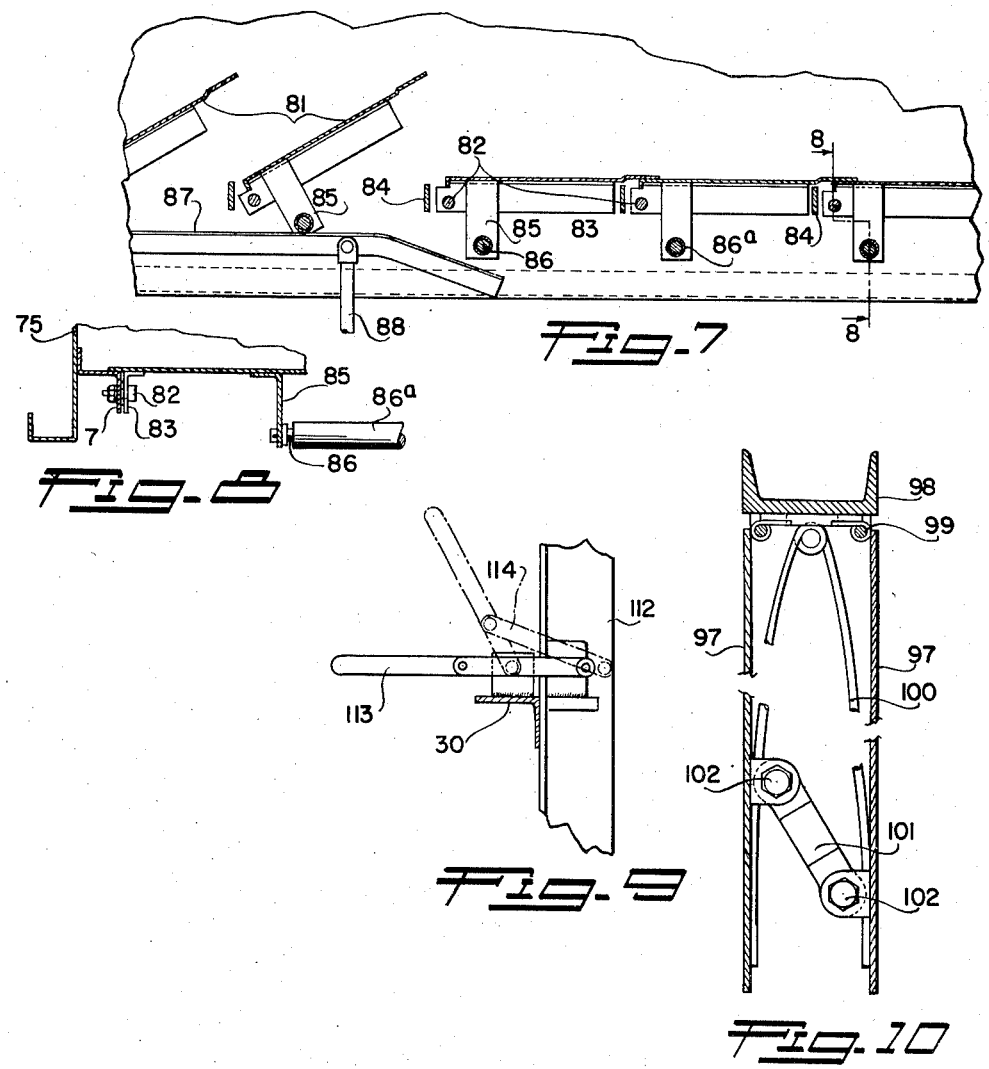

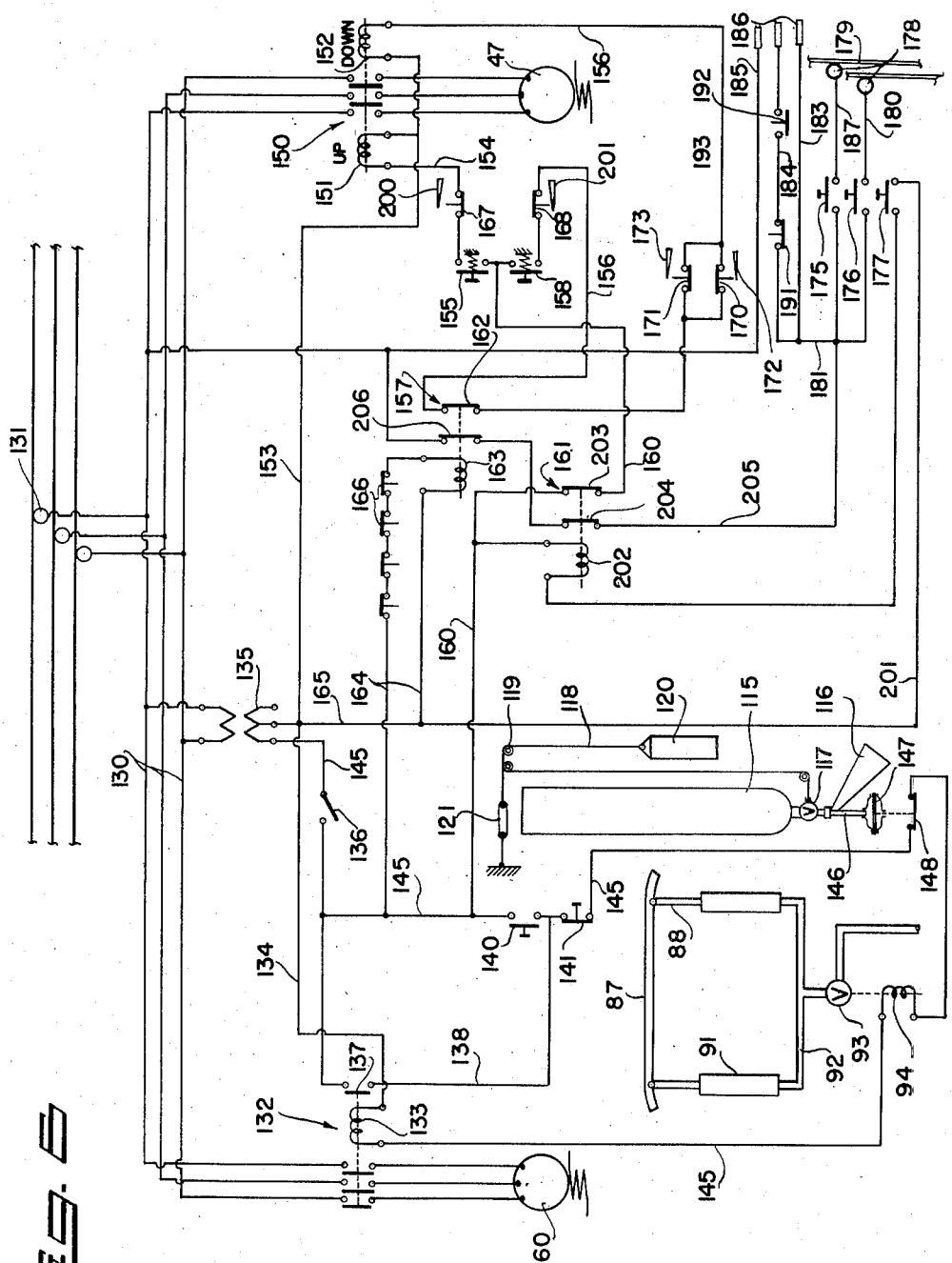

United States Patent Office 2,829,582
Patented Apr. 8, 1958

2,829,582

APPARATUS USEFUL IN PAINTING AIRCRAFT

Chester Abbott, Los Angeles, and George E. Henderson, Jr., Burbank, Calif., assignors to Lockheed Aircraft Corporation, Burbank, Calif.

Application January 18, 1954, Serial No. 404,481

15 Claims. (Cl. 98—115)

This invention relates to the painting, and the like, of large and relatively large instrumentalities, and relates more particularly to equipment useful in painting, cleaning, and otherwise processing and servicing airplanes and other large vehicles and devices.

In the production of aircraft it has been the general practice to move the airplanes from the production or assembly line to a special paint hangar for the actual painting operations and to then return the airplanes for the final assembly operations. These movements of the airplanes from place to place are expensive and time consuming and interrupt the assembly line flow. If the airplanes are painted in the assembly line hangar or building, with the equipment heretofore available, the paint overspray, evaporating paint solvents, etc., create an extremely hazardous inflammable or explosive atmosphere and such painting operations in the assembly line building or hangar were to be avoided in the past if possible.

In cleaning and painting airplanes and in performing like operations, even in painting hangars, it has been the practice to erect portable stands or platforms for the painters and their equipment. While the use of such stands for the painting of the sides and under parts of the airplane are quite practical, it is difficult to readily construct and arrange the stands so that the painters can properly reach the upper regions of the airplane. This is particularly true in the case of the larger transports, bombers, etc. The same or similar problems arise in cleaning airplanes after service and especially in repainting and striping the larger airplanes.

It is a general object of this invention to provide a simple, practical and effective facility or apparatus useful in the cleaning, painting, and other processing of aircraft, and the like.

Another object of the invention is to provide a portable painting and cleaning booth arrangement by means of which the upper regions of an airplane, or the like, can be easily and quickly painted or otherwise processed in a short time without the necessity of erecting stands or platforms and without climbing on or even directly engaging the airplane in any way.

Another object of the invention is to provide equipment of this character in which the painting and/or cleaning booth may carry one or more painters and/or workers and their painting and cleaning equipment, and is movable both horizontally and vertically at will, whereby the booth may be brought to a position above the airplane or other object and then moved fore or aft therealong as the painting, cleaning, or other processing progresses. In this way the workmen and their equipment are readily brought to position at, say, one end of the airplane, or the like, and are then moved along and over the airplane as the same is cleaned, painted, etc. and at the completion of the operation or processing the booth is removed to a remote service and access platform, thus leaving the airplane free and clear.

Another object of the invention is to provide apparatus of this kind incorporating a novel and highly efficient exhaust system for continuously exhausting the paint overspray, vapors, fumes, etc. from the booth and carrying or exhausting the same from the hangar or building, thereby maintaining a safe environment or atmosphere for the workmen, promoting clean painting conditions and avoiding, so far as possible, fire and explosive conditions. The exhaust system maintains an upward flow or circulation of air through the movable booth to carry away the overspray, volatile paint constituents, dust, etc. thereby preventing the development of a hazardous atmosphere in the booth and keeping the booth dirt and dust free.

Another object of the invention is to provide an apparatus of this character in which the exhaust system incorporates an efficient duct and blower system which delivers the circulating air to a stationary overhead duct which exhausts to the atmosphere outside the building, the duct and blower means being such that the overhead duct is closed to the interior of the building except where it is progressively opened in part to the booth as the booth progresses along the airplane or other object.

Another object of the invention is to provide apparatus of the character mentioned incorporating safety means or features which automatically terminate the air flow to the overhead duct in the event of fire, closes off the booth exhaust system and introduces or discharges a fire extinguishing medium into the booth in the event of fire in or adjacent the booth. These safety means prevent the propagation of fire in the stationary duct system, confining the fire to the booth itself and provide for the extinguishing or control of the fire.

It is another object of the invention to provide an apparatus of this kind in which the booth is vertically extensible and contractable and is constructed to straddle or bridge the airplane, or the like, whereby the painters or workmen may be brought into close proximity to their work, the booth being movable or adjustable vertically in conformance to changes in the contour of the airplane, or the like.

A further object of the invention is to provide an apparatus of this character incorporating safety or limit devices and circuits which serve to prevent over-travel of the booth in the various directions, thereby precluding the possibility of damage or injury to the booth, the airplane and adjacent equipment.

A still further object of the invention is to provide an apparatus of this kind that is simple and convenient to use, operate and control and that is readily maintained in a safe, efficient working condition, being equipped with replaceable filter pads, etc.

Other objectives and features of the inventon will become apparent from the following detailed description of a typical preferred embodiment and application of the invention illustrated in the accompanying drawings in which:

Figure 6 is a schematic wiring diagram of the principal circuits embodied in the apparatus;

Figure 7 is an enlarged fragmentary vertical sectional view of a portion of the overhead duct illustrating the manner in which the louvers thereof are opened;

Figure 8 is a fragmentary vertical sectional view taken as indicated by line 8—8 on Figure 7;

Figure 9 is a fragmentary side elevation illustrating the control for the air hose guide means; and Figure 10 is an enlarged vertical sectional view of the automatic or spring loaded damper of the air circulating duct system of the booth.

Figure 1:
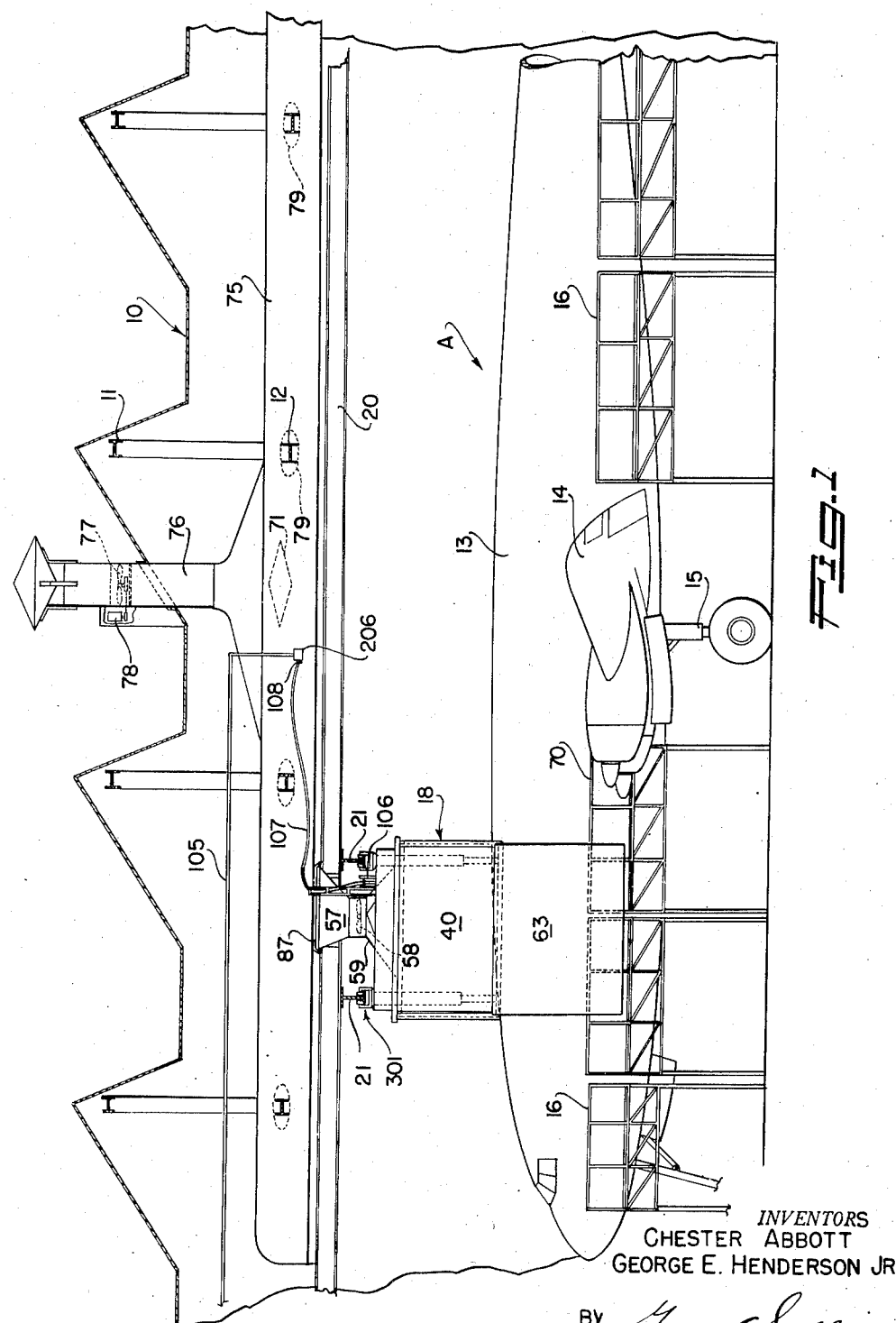
Figure 1 is a more or less diagrammatic vertical sectional view of the apparatus showing the booth in operative position over an airplane fuselage, the booth, overhead duct and other elements appearing in side elevation.

The apparatus of the invention may be designed and constructed to facilitate the inspection, cleaning, polishing, painting, and like processing and servicing of vehicles and other devices of various kinds. In the drawings we have illustrated a typical embodiment of the invention particularly well suited for the cleaning, painting, etc. of large transport type airplanes, it being understood that this is merely one illustrative example of the invention which is not to be construed as limiting or restricting either the scope or field of application of the invention.

In the drawings there is illustrated a portion of a building, including a roof 10 and spaced horizontal girders or beams 11 and 12 which may constitute elements of the roof trusses. An airplane A is shown on the floor of the building and includes the fuselage 13, wings 14, landing gear 15, etc. I have also shown stands 16 arranged to facilitate workmen access to the lower portions of the airplane fuselage 13. The present invention is not primarily concerned with the details of the building, the airplane, or the stands, or with these elements themselves except insofar as they are used in combination with the apparatus of the invention.

The invention provides an enclosure or booth 18 constructed and arranged for movement on or by an overhead crane system. The crane system, as illustrated, includes a plurality of spaced tracks or rails 20 which, in this case, will be considered the longitudinal rails as they extend longitudinally with reference to the airplane fuselage 13. The crane system further includes a traveling bridge comprising bridge rails 21 carrying motor driven wheels 22 operating along the longitudinal rails 20. The crane cab 23, for the crane operator, is, in turn, carried by this bridge to move therealong and to therefore move both longitudinally and transversely of the longitudinal rails 20, the cab having power driven wheel means 24 operating on the bridge. A boom or arm 25 extends from the cab 23, or bridge, and carries a hitch 9 which may be actuated or released from the cab by a remote control cable system 29. The bridge rails 21 and cab 23 are operated and controlled in the manner well known to those skilled in the crane art. The invention provides siding crane rails 26, see Figure 2, which may carry or receive the booth 18 when the latter is not in use. A service platform 27 is provided below the siding rails 26 to facilitate workman entrance to the booth, the loading and unloading of paint, painting equipment, etc. to and from the booth. The platform 27, which is preferably raised from the floor, has guard rails or chains 28, at least portions of which are removable to allow movement of the booth 18 to and from the position at the platform.

Figure 3:
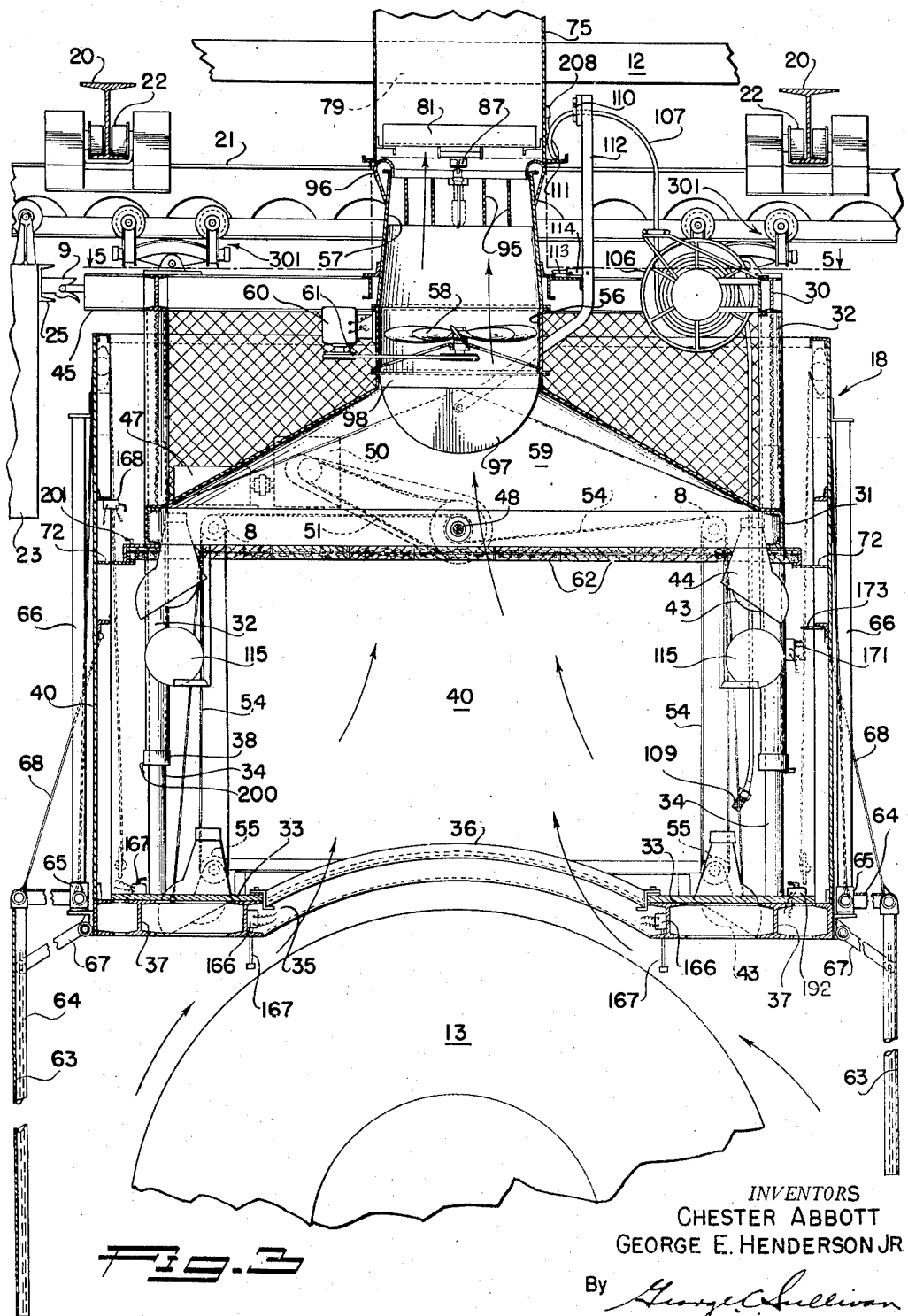
Figure 3 is an enlarged vertical sectional view of the booth, a portion of the overhead duct, overhead crane system, etc.

The above mentioned booth 18, which constitutes a traveling work platform or enclosure for the painters or other workmen, and for their materials and equipment, also contains or carries elements of the exhaust system, fire prevention system, controls, etc. The booth 18 is not only adapted to travel horizontally to any required location on the crane system but is also vertically extensible and contractable and by reason of these various motions is adapted to bring the workmen and their equipment and supplies to practically any required location at the airplane A. In the typical construction illustrated the booth 18 includes an upper square or rectangular frame 30, a lower frame 31 and four corner posts or tubes 32 extending between and connecting the two frames. The frames 30 and 31 and the tubes 32 constitute the skeleton or framework of a unit that travels with and along the crane bridge 21 but which does not move in the vertical direction. The upper frame 30 has spaced wheeled trucks 301 for operating along the rails 21 and 26 to suspend the booth 18 from the track system for horizontal movement. The booth 18 further includes a unit supported by the above described movable unit for vertical adjustment or movement. This latter vertically movable unit includes a generally horizontal platform 33 having four upstanding posts 34 slidable longitudinally in the tubes 32 to be guided for vertical movement. The platform or floor 33 is divided longitudinally or has an opening 35 of substantial size which exposes the upper portion of the airplane fuselage 13, see Figure 3. The opening 35 makes the fuselage accessible to the workmen or painters standing on the floor 33 at one or both sides of the opening 35. If desired, a slightly raised bridge 36 may be provided to extend across the opening 35 at one end thereof to further facilitate work upon the upper surface areas of the fuselage 13. As shown in Figure 3, the framework 37 of the platform or floor 33 is arched or curved upwardly at each end of the opening 35 to conform generally with the convex upper region of the fuselage 13, thus allowing the vertically adjustable booth unit to be brought to positions where it straddles and rather closely conforms with the fuselage. The above mentioned corner posts 34 are secured to the sub-structure or framework 37 and extend upwardly into the tubes 32 of the upper booth unit. The posts 34 slide freely in the tubes 32 and appropriate anti-friction bearing means 38 may be provided on the tubes to cooperate with the posts.

The lower vertically movable section or unit 33—34—37 of the traveling booth 18 further includes suitable sides and end walls 40 provided with at least one hinged access door 41 to facilitate workman entrance and exit and provided with one or more windows 42, whereby the workmen in the booth may directly or visually signal the crane operator in the cab 23 to move or advance the booth 18 as the work progresses. Appropriate lamps 43 and reflectors 44 are arranged in the booth 18 to illuminate its interior and more particularly to illuminate the upper surface regions of the fuselage 13 exposed and accessible at the opening 35. The interior of the booth 18 may, in practice, be provided with other fixtures and fittings such as seats, safety straps, etc. such details being omitted from the drawings as being obvious and optional. A draw bar 45 extends from one end or side of the booth 18 and carries the tongue or male member for engagement by the above described hitch 9 of the crane cab 23.

The booth 18 further includes means for raising and lowering the vertically adjustable unit 33—34—37 of the booth 18 whereby the floor 33 and its opening 35 may be brought to the proper adjacent relation to the airplane fuselage 13 and adjusted as the work progresses along the fuselage to be maintained in the adjacent operative relation to the fuselage. This means includes an electric motor 47 mounted on the lower frame 31 of the booth and driving a horizontal through shaft 48 through the medium of a speed reducing gear box 50 and a chain and sprocket drive 51. The shaft 48 is provided at its opposite ends with a pair of adjacent pulleys 52 and 53. Lines or cables 54 are wound on the pulleys or drums 52 and 53 and operate over pulleys 55 rotatably mounted adjacent the corners of the movable platform or floor 33, and then over pulleys 8 on the frame 31, each cable 54 being attached at one end to the framework 37. These block and tackle like arrangements are such that rotation of the shaft 48 in one direction raises the floor 33 and verticaly movable lower unit of the booth 18 and rotation in the other direction causes or allows this booth unit to move downwardly. The controls for the vertical adjusting motor 47 will be hereinafter described. As will be seen from an inspection of Figures 3 and 4, the sides or walls 40 of the vertically movable lower unit of the booth 18 telescope over or around the frames 30 and 31 of the upper booth unit and the relationship is such that the floor 33 and walls 40 may have substantial vertical movement relative to the upper frames 30 and 31 so as to adjust or conform the booth 18 to various airplane fuselages and to the changing shapes or elevations of such fuselages.

The invention further provides an air circulating system or exhaust system for moving air upwardly through the booth 18 and for exhausting the air and paint vapors, etc. from the hangar or building. This system includes a hood 59 secured in the lower frame 31 and facing downwardly to receive upflowing air from the booth 18. A duct 56 extends upwardly from the hood 59 and has an exhaust part or exit 57 elongated in the direction of the longitudinal crane rails 20. A blower 58, preferably of the bladed fan type, is rotatably mounted to operate in the duct 56 to move air upwardly through the booth 18, the hood 59 and out through the exit part 57. A motor 60 is mounted adjacent the duct 56 and a belt and pulley drive 61 extends from the motor to the blower 58 whereby the motor drives the blower. The control for the blower operating motor 60 will be hereinafter described.

It is desirable to remove, so far as possible, all the paint overspray solids and liquids from the air flowing upwardly through the booth 18 prior to conveying the air from the building. To this end filter means is provided at the lower end of the hood 59. This filter means preferably includes two layers or tiers of removable filters 62. The filters 62 may be of the type embodying pads or masses of spun glass, or the like, coated with oil. The tiers or filters 62 are arranged one above the other across the lower or receiving end of the hood 59 and are individually removable. In practice the lower row or tier of filters 62 will filter out or collect the major proportion of the solid and liquid paint overspray, etc. and after a period of use of the booth this lower tier may be removed and the upper tier of filters 62 moved to the position of the lower tier, whereupon a new or replacement upper tier of filters may be installed. The lower end of the hood 59 equipped with the filters 62 is extensive and receives the upwardly flowing air from the major ceiling area of the booth 18. As indicated by the arrows in Figure 3, the air flows upwardly and inwardly around the fuselage 13 to enter the opening 35, then passes upwardly through the interior of the booth 18 to flow out through the filters 62, duct 56 and exit 57. The air stream rising around the sides of the fuselage 13 enters the opening 35 at a substantial velocity, the opening being restricted by the adjacent surfaces of the fuselage 13 and the rapidly moving air stream immediately and effectively carries away excessive paint spray, fumes, etc.

Figure 2:
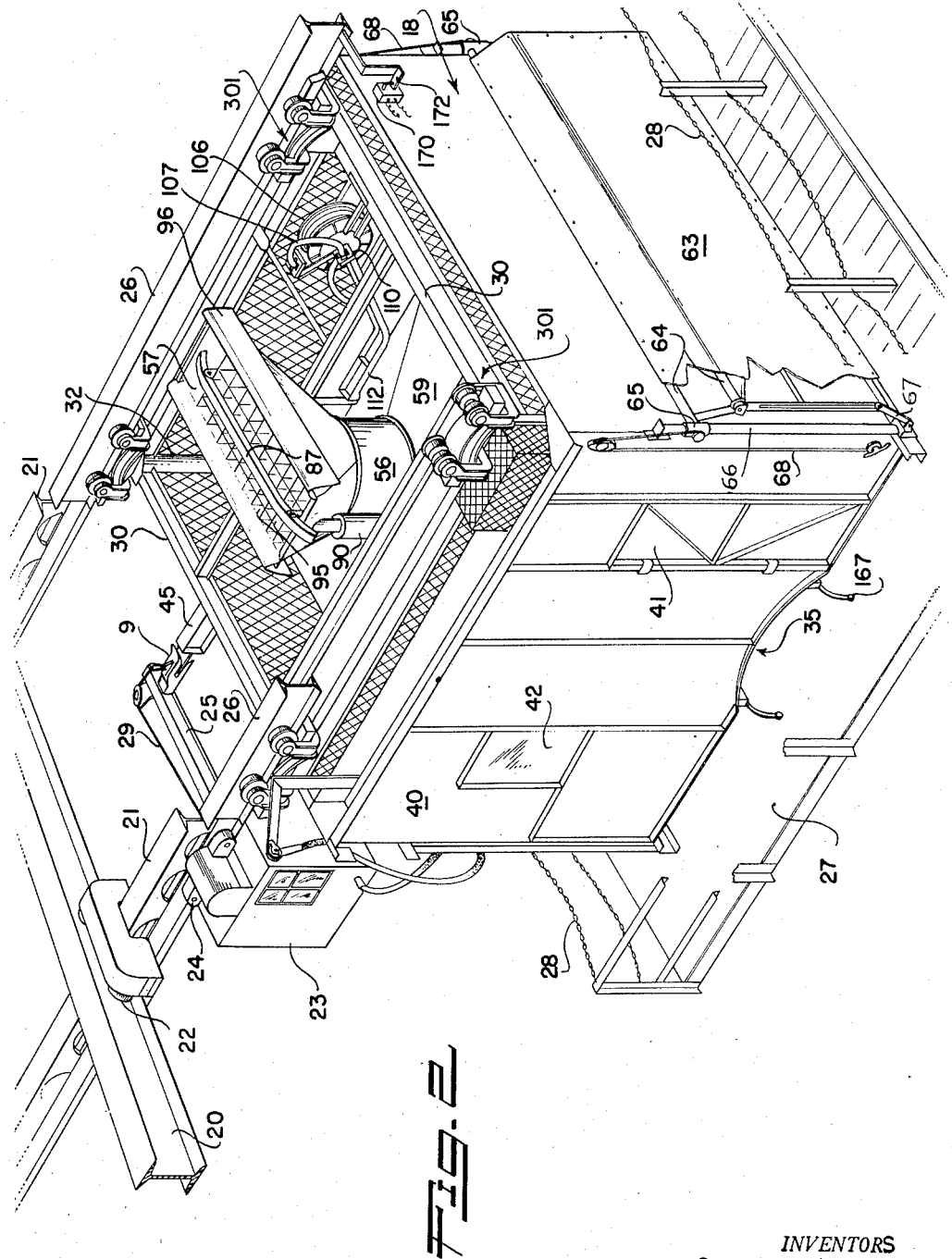
Figure 2 is an enlarged perspective view of the booth and adjacent elements showing the booth in position at the service platform.

Side curtains 63 are provided on the booth 18 to hang over the side regions of the fuselage 13 to assist in directing the induced air flow into the booth opening 35 in desirably directed paths and to protect against unwanted or excessive escape of paint spray from the booth during the painting operations. The curtains 63, which may be constructed of a suitable fabric, have frames 64 of tubing, or the like, provided with collars or sleeves 65 slidable vertically on posts 66. The lower ends of the posts 66 are anchored to the floor or platform 37 while the upper ends of the posts may be anchored to the side walls 40 of the booth 18. The curtain frames 64 are articulated so as to move between raised positions parallel and adjacent with the sides 40 of the booth when the sleeves 65 are raised on the posts 66, as shown in Figure 2, and extending positions where the sleeves 65 are lowered to the lower portions of the posts. Lever arms 67 are hinged or pivoted on the platform 37 and have sliding connections with the curtain frame 64 and serve to move the curtains 63 outwardly when the curtains are lowered. Lines or cables 68 may be used to raise and lower the curtains and to retain them in the raised positions. As shown in Figure 1, when the curtains 63 are lowered, their lower portions may extend outwardly over the guide rails 70 of suitable platforms 16 erected at the sides of the airplane A. The workmen or painters may stand on the platforms 16 under the curtains 63 and the air directed upwardly around the fuselage 13 and under the curtains 63 will carry the paint overspray and vapors into the booth 18 for discharge by the exhaust system of the invention. Wiper or seal strips 72 are preferably secured to the frame 31 to engage with the internal surfaces of the booth walls 40 and prevent the flow or leakage of air between these parts.

The exhaust system further includes an overhead duct 75 supported in the ceiling or upper region of the building in the painting area which may also be a production line area. The duct 75, which is generally horizontal, is arranged between adjacent crane tracks 20 in parallel relation therewith. As best shown in Figure 1, the duct 75 is closed at its ends and has one or more riser ducts or outlets 76 extending through the roof 10 to discharge into the atmosphere. The outlet 76 is equipped with a powerful blower 77 for moving the air through the duct 75 and for discharging it from the outlet. An electric motor 78 drives the exhaust blower 77. Where the outlet 76 is between the opposite ends of the duct 75 a flow directing island 71 is arranged in the duct adjacent the lower end of the outlet to divert the airflow upwardly into the outlet. The roof beams 12 pass transversely through the duct 75 and the duct may have streamlined sheaths 79 around the beams. In accordance with the invention the lower side of the duct 75 is open and is provided with a series of adjacent gates or louvers 81, see Figures 4, 7 and 8.

The louvers 81 of the exhaust duct 75 are in the nature of gates or closures and are individually movable between closed horizontal positions and raised sloping open positions. Each louver 81 is supported adjacent one end or edge by hinge pins 82 engaged in openings in flanges 7 on the duct and down-turned flanges 83 on the longitudinal edges of the louvers. The edge of each louver 81 opposite its hinge mounting is adapted to lap over and rest on the hinged end portion of the adjacent louver, as seen in the right hand portion of Figure 7. Where the louvers 81 are hinged adjacent one end they are adapted to move by gravity from the raised open positions to the closed positions. Braces 84 extend transversely through the duct 75 adjacent the ends of the louvers 81 to tie the side walls of the duct together. Each louver 81 has lugs or ears 85 extending downwardly adjacent but spaced from its hinge pin 82 and these ears 85 carry horizontal rods 86. The rods 86 in turn carry freely rotatable tubes or rollers 86ª. It will be noted that these rollers 86ª are spaced below the plane occupied by the closed louvers 81.

Figure 4:
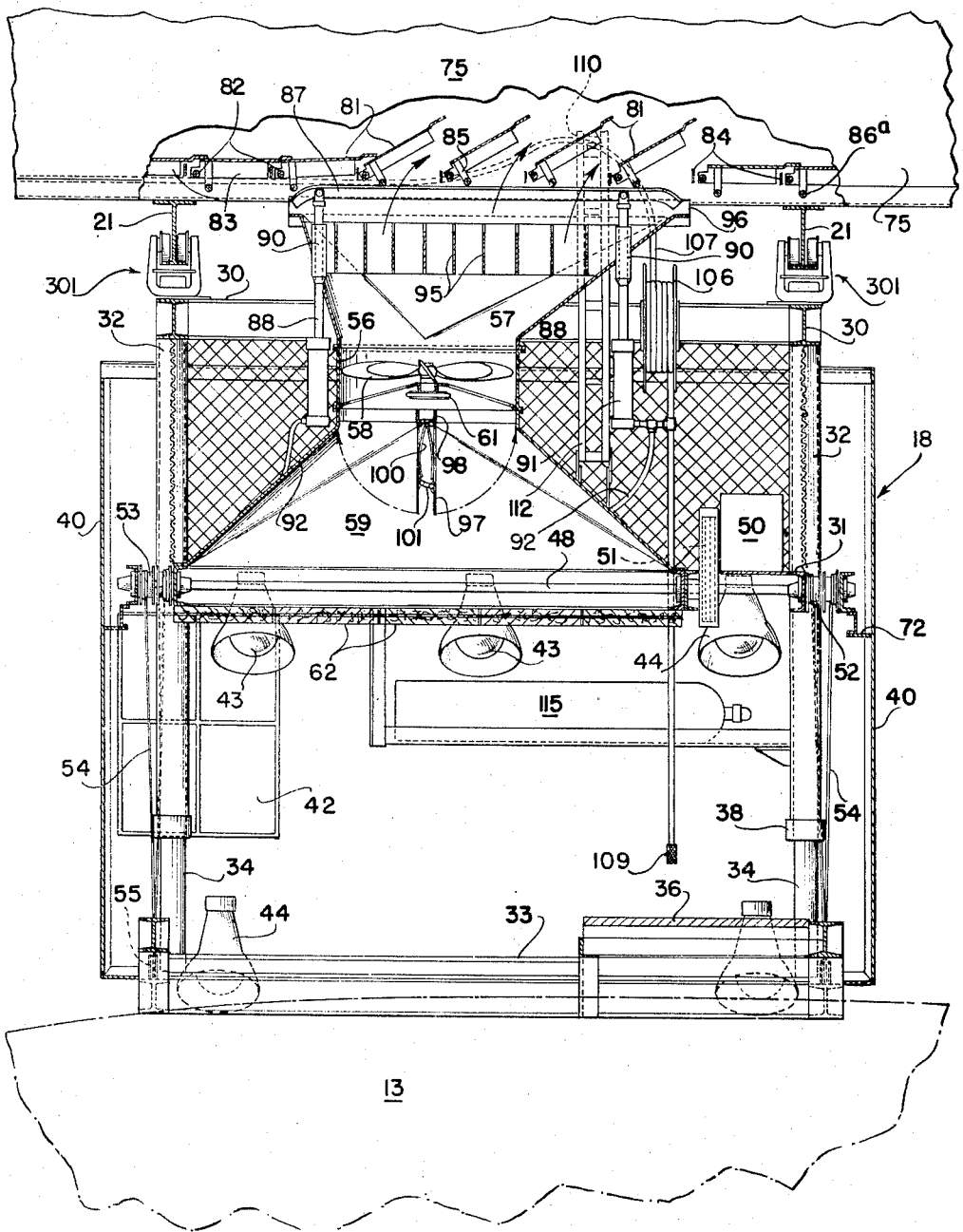
Figure 4 is an enlarged vertical sectional view of the booth and adjacent equipment taken in a plane at right angles to the plane of sectioning of Figure 3 illustrating the manner in which the air is circulated into the overhead duct system.
Figure 5:
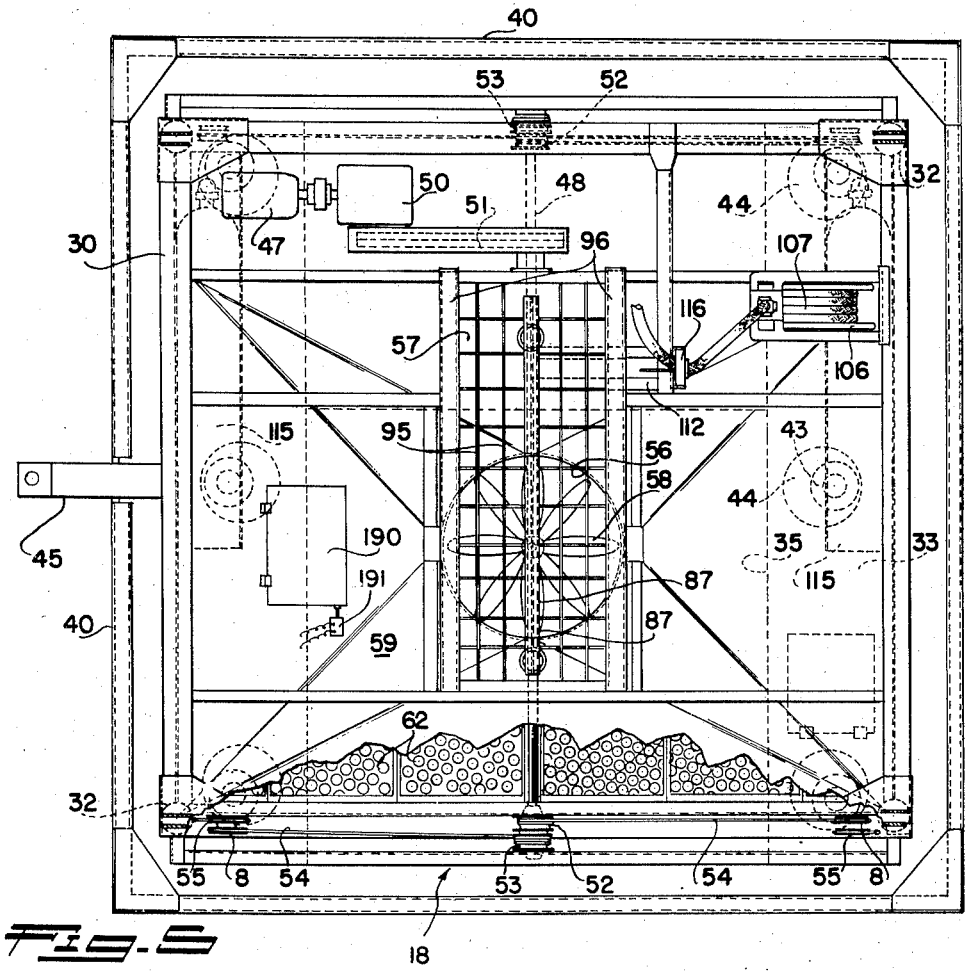
Figure 5 is a top or plan view of the booth with certain portions broken away to illustrate the filters and the booth extending and contracting means.

The invention provides means on the booth 18 for cooperating with the rollers 86ª to successively open the louvers 81 as the booth is moved along the airplane A. This means includes a horizontal cam or skid 87 arranged at the upper end of the booth duct exit 57 for cooperating with the rollers 86ª. The skid 87 is carried by two spaced vertical rods 88 which slidably pass through guides 90 in the walls of the exit 57. The lower ends of the rods 88 may constitute, or be secured to, pistons operating in vertical cylinders 91 mounted in the upper booth frame 30. As illustrated diagrammatically in Figure 6, actuating air under pressure is supplied to the lower ends of the cylinders 91 by a pipe 92 controlled by a solenoid actuated valve 93. The energizing circuit for the actuating solenoid 94 of the valve 93 will be hereinafter described. The louver opening cam or skid 87 is actuated to the raised position to open the louvers 81 when the booth 18 is to be moved along the longitudinal tracks or rails 20 over the airplane A and as the booth is progressively moved along the rails the skid 87 successively opens the louvers above the booth. The skid 87 is sufficiently long to hold several louvers 81 open at any one time so that the duct exit 57 of the booth has substantially full communication with the interior of the duct 75. As best shown in Figure 4, the opposite ends of the skid 87 are curved or sloped downwardly so as to readily cooperate with the rollers 86a as the booth 18 is moved along under the duct 75. It will be seen from an inspection of Figures 4 and 7 that cooperation of the skid 87 with the rollers 86a opens or raises the individual louvers 81 to positions where they incline upwardly so as to direct the air flow longitudinally into the duct 75. It is preferred to arrange a series or grid of flow straightening vanes 95 in the booth duct exit 57 whereby the air stream flowing out through the louvers 81 has little or no rotary motion. It is preferred to provide flexible bulging seal strips 96 of rubber, fabric, or combinations of such materials, along the edges of the booth duct exit 57 to seal or cooperate with the lower wall of the overhead duct 75 to prevent or reduce the leakage of air from between the exit and duct.

From the foregoing it will be seen that the blower 58, assisted by the blower 77, provides an upward flow of air into the lower end of the booth 18 and under the curtains 63, the air passing upwardly through the interior of the booth, then through the filters 62, duct 56 and exit 57 into the duct 75 to be exhausted from the building. This maintained and substantial air flow through the duct 18 effectively and immediately carries away the paint overspray, paint vapors, dust, etc.

A valve means or damper is provided in the booth duct 57 to automatically close off the same and therefore terminate air flow through the booth 18 and into the duct 75 in the event of fire in the booth. This damper valve is shown in Figures 4 and 10 and includes a pair of complementary closures 97, hinged to a horizontal support 98 at 99. The closures 97 are shaped to substantially completely close off the duct 57 and are urged to the closed horizontal positions by a torsional spring 100 engaged between them. However, the damper closures 97 are held in the open substantially parallel downwardly extending positions illustrated in the drawings by a fusible or heat sensitive link 101 connected to their inner sides at 102. The link 101 is designed to hold the closures 97 in the open positions where they offer a minimum of resistance to air flow through the duct 57 until a predetermined high or dangerous temperature is reached in the upper region of the booth 18 whereupon the link softens and fails under the force of the spring 100 to allow the spring to quickly close the damper closures 97. It will be seen that with the duct 56 closed at its lower end by the closures 97, a fire that may exist in the booth cannot spread into the upper blower region of the duct and cannot ignite the vapor-air mixture flowing out through the overhead duct 75.

Although the booth 18 may be equipped with a compressor or other source of air pressure for actuation of the cylinders 91 and for use in the paint spray guns and like devices, it will usually be preferred to employ air under pressure from the supply system of the hangar or building. To this end an air pressure supply pipe 105 is provided in the roof area of the building and has an outlet 206 located substantially intermediate the ends of the exhaust duct 75. A rotatable hose reel 106 is mounted in the upper frame 30 of the booth 18 and carries an air hose 107 provided at its end with a fitting 108 adapted to be releasably coupled with the outlet 206 of the supply pipe to receive air under pressure therefrom. The reel 106, which may be spring actuated, may be of the type employed in gasoline service stations, and the like, and the air under pressure supplied to its hose 107 is delivered to a dispensing or service manifold 109 leading down into the booth 18 to supply the paint guns and like devices, not shown. The above mentioned air pressure supply pipe 92, leading to the cylinders 91, is connected with this service line or pipe 109. The flexible hose 107, wound on the reel 106, is sufficiently long to remain coupled with the supply outlet 106 throughout movement of the booth 18, the full length of the airplane A, and/or the length of the duct 75, having a length somewhat greater than one-half the length of the duct 75. A guide 110 is provided at the upper end of the booth 18 to guide the hose 107 between the reel 106 and a guide and supporting shelf or flange 111 on the side of the exhaust duct 75. This guide 110 is carried by a movable arm 112 so as to be movable between a retracted position at the top of the booth 18 where it will clear the crane rails, duct 75, etc. to permit free movement of the booth in the building and a raised operative position such as shown in Figure 3 where the hose guide 110 is in a plane above the plane of the flange 111. A manually operable lever 113 is pivoted on the top frame 30 of the booth 18 and is connected with the guide arm 112 by a link 114 so as to retain the arm 112 in the raised position.

The invention preferably includes a fire extinguishing system for the booth 18. This system includes one or more containers or cylinders 115 of a fire extinguishing medium under pressure, such as carbon dioxide. In Figure 6 there is diagrammatically illustrated a cylinder 115 of such fire extinguishing medium, it being understood that in actual practice several such cylinders may be employed. The system has a discharge horn or nozzle 116 for discharging the fire extinguishing medium into the booth 18 and a normally closed valve 117 is interposed between the supply cylinder 115 and the nozzle 116. The valve 117 is adapted to be operated or opened by a weight and cable arrangement, including a cable system 118 connected with the valve and operating over guide pulleys 119 to carry a weight 120. A fusible or heat sensitive link 121 is connected with the cable system 118 in a manner to normally support or suspend the weight 120 and thus relieve the valve 117 of the actuating or opening force. The link 121 is designed to soften and fail at a given temperature, for example a temperature that would be expected to exist in the booth 18 in the event of a fire therein, and thus allow the weight 120 to open the valve 117. This opening of the valve 117 by the heat responsive gravity actuated means, results in the discharge of the fire extinguishing gas or medium into the booth 18 to extinguish or control the fire therein. As will be later described, the pressure of the released fire extinguishing medium flowing through or from the valve 117 is utilized to de-energize the blower 58 and to allow the skid 87 to move to the retracted position so that the flow of air is terminated and the louvers 81 are closed to close off the exhaust duct 75 from the booth 18.

The controls and control circuits for the various instrumentalities of the device are diagrammatically illustrated in Figure 6. Electrical power is obtained from the tracks or trolley rails of the crane system and there is illustrated a three-wire system 130 in the crane having collectors or trolley wheels 131 cooperating with the rails to be energized therefrom. The motor 60, for driving the exhaust blower 58 of the booth 18 is energized by the power lines 130 through the medium of a starter switch 132 connected in the lines 130. This switch 132 has an actuating coil 133, one terminal of which is connected in a line 134. This line 134 extends from one tap of the secondary of a transformer 135 connected with the power system 130. A line 145 extends from the other terminal of the coil 133 to a second tap of the transformer 135. This line 145 may be considered a main conductor of the control system in the booth 18 and has interposed therein a main control switch 136 readily accessible to the workmen in the booth 18. The starting switch 132 has a contactor 137 in addition to the contactors for the power lines 130 and this contactor 137 controls a bridge or branch line 138, having its opposite ends connected with the line 145. A normally open switch 140 is interposed in the line 145 and is adapted to be closed to start the blower motor 60 and a normally closed switch 141 is connected in the line 145 to be operable to stop or de-energize the motor, these switches being in opposite sides of the junction of the line 145 and one terminal of the line 138 so that the switch 140 is in parallel with the contactor 137. The switches 140 and 141 may be of the push-button type. With the main switch 136 closed, the "on" switch 140 may be closed to complete the circuit through the lines 134 and 145 to the winding 133 of the starter switch 132 to start the motor 60. Energizing of the winding 133 also closes the contactor 137 of the line 138. With the contactor 137 in the closed position a circuit is maintained to the coil 133 through the lines 134, 145 and 138 even though the "on" switch 140 has returned to its normally open position. To stop the blower motor 60 the "off" switch 141 is opened, thus breaking the circuit to the coil 133, opening of the switch 141 serving to disconnect the coil 133 from the source of control power.

It will be observed in Figure 6, that the above mentioned solenoid 94 for actuating the valve 93 is connected in series in the line 145 in a region between the winding 133 and the switches 140 and 141 so that the solenoid 94 is energized and de-energized simultaneously with the actuating winding 133 of the blower starter switch 132. With this arrangement the louver opening skid 87 is moved upwardly by the cylinders 91 when the blower motor 60 is started and is allowed to move downwardly when the blower motor is de-energized. Therefore, if the booth 18 is properly positioned under the exhaust duct 75 above the airplane A, closing of the switch 140 automatically opens the louvers 81 above the booth 18 and conditions the skid 87 to successively open other louvers as the booth is advanced and simultaneously energizes the blower motor 60 so the blower 58 is operated to produce the upward circulation of air through the booth and out through the duct 75. Operation of the switch 141 de-energizes both the solenoid 93 and the winding 133 so that the skid 87 lowers and the louvers 81 close simultaneously with de-energization of the blower motor 60.

The above described fire extinguishing or fire control means, in addition to discharging a fire extinguishing medium into the booth 18 in the event of a fire, also serves to control the conductor or line 145 to automatically de-energize the solenoid 94 and the blower motor starter winding 133 to allow closing of the louvers 81 and to de-energize the blower 60 in the event of a fire. As shown in Figure 6, a fluid line or pipe 146 extends from the outlet of the fire extinguishing valve 117 to a pressure actuated diaphragm means 147. This diaphragm means 147 is, in turn, operatively connected with a normally closed switch 148 interposed in the line 145 in the region between the switch 141 and the solenoid 94. When the valve 117 is open, as above described, the pressure of the discharging fire extinguishing medium operates the diaphragm device 147 which, in turn, opens the switch 148. Opening of the switch 148 de-energizes the solenoid 94 and the winding 133 so that the skid 87 is lowered to allow closing of the louvers 81 and to terminate operation of the blower 58.

The operating and control system of the device further includes a reversing switch 150 for the hoist motor 47. The switch 150 is connected in the power circuit 130 which energizes the hoist motor 47 and the switch has the usual forward and reverse solenoids or windings 151 and 152 which, in this case, may be considered the "up" and "down" windings. The switch windings 151 and 152 each have a terminal connected to a common return or line 153 extending to a tap of the transformer 135. A lead 154 extends from the other terminal of the "up" winding 151 to a manual switch 155 while a similar lead 156 extends from the second terminal of the "down" winding 152 to a relay 157 and thence to a manual switch 158. The switches 155 and 158, which are arranged in adjacent and conveniently accessible relationship in the booth 18, may be of the normally open spring loaded push-button type and are adapted to be manually operated or closed to respectively produce upward and downward travel of the vertically adjustable section or unit of the booth 18. The switches 155 and 158 are adapted, when closed to connect their respective leads 154 and 156 with a line or lead 160 extending to a relay 161 and thence to the above described control power line 145.

The invention includes means for limiting downward travel of the vertically adjustable booth unit 33—34—37 when the booth 18 is over the airplane A to prevent the booth unit from directly contacting and damaging the airplane in the event of inadvertent or excessive downward travel. This means includes the above mentioned relay 157 which has a contactor 162 cooperating with posts or terminals in the lead 156 so as to normally complete the lead and the relay further includes an actuating winding 163. The energizing line or circuit 164 for the relay winding 163 has one end connected with the control power line 145 and its other end connected with a return line 165 to the transformer 135. A plurality of normally closed spring urged limit switches 166 is interposed in the relay circuit 164. The switches 166 have downwardly projecting operating arms 167 at the under side of the booth floor 33, located adjacent the four corners of the painting access opening 35 so as to contact the highest portions of the airplane A. The switches 166 are connected in series so that the engagement of the arm 167 of any one switch with the airplane A will open the switch and, therefore, open the circuit 164 to de-energize the relay winding 163 and thus open the contactor 162 to de-energize the down-winding 152 of the hoist controlling switch 150. This of course stops downward travel of the movable booth unit and prevents the possibility of damage to the airplane A.

The control system further includes a limit switch 167 in the lead 154 and a similar limit switch 168 in the lead 156, operable to de-energize the hoist motor 47 in the event of excessive vertical travel of the vertically adjustable unit of the booth 18. The switch 167 is in the lead 154 in the region between the switch 150 and the push-button switch 155 and is operated by a cam 200 on the upper frame structure 30—31 of the booth 18 when the movable unit of the booth reaches the upper end or limit of its vertical travel. Operation or opening of the switch 167 opens the circuit to the winding 151 and the hoist motor 47 is de-energized. The switch 168 is in the lead 156 in the region between the relay 157 and the down switch 158 and is actuated or opened by a stop or cam 201 on the upper frame structure 30—31 of the booth 18 when the movable unit of the booth reaches the lower extremity of its vertical travel. Opening of the limit switch 168 de-energizes the winding 152 to stop the hoist motor 47.

Limit switch means are provided in the energizing lead 156 of the down-winding 152 of the hoist motor 47 starting switch to prevent excessive downward travel of the vertically adjustable unit 33—37 of the booth 18 when the booth is above the service platform 27. This means includes two limit switches 170 and 171 connected in parallel in the circuit or lead 156. The switches 170 and 171 are both of the normally closed spring urge type. The switch 170 is carried by the lower or vertically adjustable unit 33—34—37 of the booth 18 while the switch 171 is on the upper unit 30—31—32 of the booth. The switch 170 is adapted to be opened by a cam 172 on a rail 26. The switch 171 is adapted to be opened or operated by a cam 173 on the lower frame structure 33—34—37 of the booth 18 when the hoist motor 47 has been energized to move the vertically adjustable booth unit 33—37 to an intermediate vertical position where its floor 33 is approximately in the plane of the platform 27. The opening of the switch 171 by the cam 173 when the booth 18 is in any position away from the platform 27 does not de-energize the winding 152 and, therefore, does not interfere with vertical adjustment of the telescopic booth 18. However, opening of the switch 171 after the switch 170 has been opened upon bringing the booth 18 over the platform 27 has the effect of de-energizing the winding 152 to terminate vertical adjustment of the booth in the proper position above the platform.

The control system further includes circuits to be coupled with the crane cab 23 for the control of crane movement of the booth 18, these circuits being such that these motions of the booth may be controlled either from the booth 18 or the crane cab. The booth 18 is equipped with conveniently accessible switches 175 and 176, which may be of the normally open push-button type. Collectors 178 on the booth 18 cooperate with the bars 179 of the crane system which, in turn are electrically connected with the forward and reverse sides of the bridge travel motor switches of the crane, not shown. Leads 180 and 187 extend from these collectors 178 to a common line 181 and this line 181 has two branches 183 and 184. The branches 183 and 184 together with a common line 185 from one of the power lines 130, have plugs or connectors 186 adapted to be plugged into or connected with the motor control circuits of the crane cab, not shown. The line 187 may be considered the forward bridge travel or movement producing line and the line 180 may be considered the line for producing reverse bridge travel movement. The above mentioned switch 175 is connected in the line 187 and is adapted to be manually closed to energize a crane motor, not shown, to produce forward travel of the crane bridge. The switch 176 is adapted to be manually closed to complete a circuit through the lines 180, 181 and 184 to energize a crane motor, not shown, to produce reverse bridge movement.

The closed ceiling of the workmen-occupied portion of the booth 18 has a hatch door 190 to give access to the hose reel 106, hoist motor 47, etc. A limit switch 191 is arranged at this door 190 to be opened when the door is raised. The switch 191 is connected in the line 184 and when it is opened upon raising the door, trolley travel or longitudinal travel of the booth 18 is prevented because the circuit to the cab control is broken. This prevents the possibility of injury to a workman that might otherwise result from movement of the booth when he is servicing the equipment in the upper portion of the booth.

A second switch 192 is connected in the trolley travel line 184. This switch 192 remains open until it is closed by a cam or stop 193 when the vertically adjustable unit 33—37 of the booth 18 has reached the upper limit of its travel. The switch 192 functions to prevent trolley travel of the booth 18 until the booth is fully contracted or raised so the booth may freely pass over airplanes and other obstructions in the building without interference.

An emergency stop switch 177 is provided to stop or terminate all motions of the booth 18 in the event of an emergency. The switch 177 which is conveniently accessible to the operators is connected in a line 201 extending from the transformer line 165 to the winding 202 of the above mentioned relay 161. The relay 161 is of the normally closed type and has a contactor 203 controlling the above mentioned lead 160 and a second contactor 204 controlling a common power lead 205 extending from the power lines 130 to the common crane travel line 181. The power line 205 is also controlled by a contactor 206 of the above mentioned relay 157. It will be seen that upon closing of the switch 177 the relay winding 202 is energized to open the contactors 203 and 204. This de-energizes the circuits to the motor switch 150 of the hoist motor 47 and the circuits leading to the collectors 178 so that both vertical adjustment and horizontal motion of the booth 18 are stopped or prevented.

It is believed that the operation of the apparatus or device will be readily understood from the foregoing detailed description. Prior to the actual painting, cleaning or other processing operations the booth 18 is preferably brought to the position over the platform 27, as shown in Figure 2, so that the paint, paint guns, cleaning equipment, and the like, may be stowed in the booth 18 and the workmen may enter the booth. Upon lowering the guard rails or chains 28 the operator in the cab 23, by appropriately controlling the crane system, brings the booth 18 to a position above the airplane A where the duct exit 57 is aligned with the overhead exhaust duct 75. The main control switch 136 may then be closed to condition the control circuits for use and the switch 155 may, if necessary, be operated to vertically adjust the booth unit 33—37 to the proper position immediately above the fuselage 13 of the airplane A, the limit switches 166 being operable to insure stopping of this motion before direct engagement of the booth with the airplane. The switch 140 may then be closed to raise the cam or skid 87 to the position where the louvers 81 are opened and to start the blower motor 60. The exhaust duct blower 77 is also put into operation. If desired or necessary the curtains 63 may be lowered. The cleaning, painting or other servicing of the airplane may then progress, the workmen in the booth 18 having free access to the upper portion of the fuselage 13 through the opening 35. As the work progresses the booth 18 may be advanced along the airplane A either by operation of the controls in the cab 23 or the above described controls in the booth 18 and the switches 155 and 158 may be manipulated to raise and lower the active portion of the booth 18 to follow the contour of the airplane. As the cab 18 is advanced along the airplane the cam or skid 87 successively opens the louvers 81 and allows other louvers to close so that the paint overspray, fumes, etc. are continuously withdrawn from the booth 18 and exhausted through the duct 75. As previously described, the air supply hose 107 is connected with the outlet 108 prior to the operations requiring air under pressure and the hose plays out and is reeled in as the motion of the cab along the airplane progresses. When the work is completed the switch 155 is operated to move the vertically adjustable section or unit 33—37 of the booth to its uppermost position, thus closing switch 192 and conditioning the booth for return to the platform 27. The hose 107 is, of course, disconnected from the supply outlet 206 prior to this return travel of the booth to allow subsequent transverse movement of the booth 8.

Having described only typical forms of the invention we do not wish to be limited to the specific details herein set forth, but wish to reserve to ourselves any variations or modifications that may appear to those skilled in the art and fall within the scope of the following claims.

We claim:

1. Apparauts for facilitating work on a relatively stationary object comprising a crane system above the object, a booth carried for movement by said system and adapted to be occupied by workmen, the booth including a first unit suspended from said system and a second unit movable vertically on the first unit, the second unit including walls telescoping around the first unit and defining a workman's compartment, the second unit having an open underside to give workman access to the object, means for circulating air vertically through said open underside and compartment, and means for moving the second unit vertically toward and away from said object.

2. Apparatus for facilitating work on a relatively stationary object comprising a crane system above the object, a booth carried for horizontal movement by said system and adapted to be occupied by workmen, the booth including a first unit carried by said system to depend therefrom and a second unit movable vertically on the first unit, the second unit including walls in telescopic relation to the first unit defining a compartment directly over the object, the compartment having an open underside to give access to the object and a workman's platform at said open underside, and means for moving the second unit vertically toward and away from said object, and means for producing an upward flow of air through the booth.

3. Apparatus for facilitating work on a relatively stationary object comprising a crane system above the object, a booth carried for horizontal movement by said system and adapted to be occupied by workmen, the booth including a first unit suspended from said system and a second unit movable vertically on the first unit, the second unit including walls in telescopic relation to the first unit defining a work compartment, and a platform in the compartment for the workmen, said compartment having an open underside to give access to the object, and means for moving the second unit vertically on the first unit toward and away from said object, an exhaust duct above the booth, and means in the booth for circulating air upwardly through said open underside and compartment and into the duct.

4. Apparatus for facilitating work on a relatively stationary object comprising a crane system above the object, a booth carried for horizontal movement by said system longitudinally and transversely of said object and adapted to be occupied by workmen, the booth including a first unit carried by said system and a second unit movable vertically on the first unit, the second unit having an open underside to give access to the object, and means for moving the second unit vertically toward and away from said object, an elongate horizontal stationary exhaust duct above the object extending in the direction of said longitudinal movement of the booth, normally closed louvers at the underside of the duct adapted to be opened to give access to the duct, retractable means on said first booth unit for successively opening the louvers as the booth is moved longitudinally along over the object, means carried by said first unit for producing an upwardly movement of air through the booth and the opened louvers into the duct, and means for retracting said retractable means so as to clear said duct and louvers when the booth is moved transversely.

5. Apparatus for facilitating work on an object comprising a track above the object, a booth movable along the track above the object and including a workman occupied unit vertically movable toward and away from the object and having a downwardly facing opening for giving access to the object, means for moving the unit vertically, duct means in the booth for receiving air from said unit and having an upwardly directed discharging exit elongated longitudinally of the track, an exhaust duct above the booth extending parallel with the track and including a plurality of independently openable normally closed louvers at its under side, vertically movable cam means on the booth for engaging said louvers to open the same and thus put said exit in communication with the exhaust duct as the booth is moved along the track, and means controllable at said unit for moving the cam means from a retracted position clear of the louvers and an extended position for engaging the louvers.

6. Apparatus for facilitating work on an object comprising a track above the object, a booth movable along the track above the object and including a workman occupied unit vertically movable toward and away from the object and having a downwardly facing opening for giving access to the object, means for moving the unit vertically to a position where said opening is at the upper side of the object, duct means in the booth receiving air from said unit and having an exit, an exhaust duct above the booth having normally closed independently openable louvers for receiving air from said exit, blower means for moving air upwardly through said unit, duct means and exit, a normally retracted movable cam on the booth operable when extended to engage and open the louvers, and a control for simultaneously energizing the blower means and extending said cam.

7. Apparatus for facilitating work on an object comprising a track above the object, a booth movable along the track above the object and including a workman occupied unit vertically movable toward and away from the object and having a downwardly facing opening for giving access to the object, means for moving the unit vertically to a position where said opening is at the upper side of the object, duct means in the booth receiving air from said unit and having an exit, an exhaust duct above the booth having normally closed independently openable louvers for receiving air from said exit, blower means for moving air upwardly through said unit, duct means and exit, a normally retracted movable cam on the booth operable when extended to engage and open the louvers, and a control for simultaneously energizing the blower means and extending said cam, said control including temperature responsive means for de-energizing the blower means and retracting said cam in the event of fire in the booth.

8. Apparatus for facilitating work on an object comprising a track above the object, a booth movable along the track above the object and including a workman occupied unit vertically movable toward and away from the object and having a downwardly facing opening for giving access to the object, means for moving the unit vertically, a hood in the booth having an upwardly extending exit, blower means in the booth for moving air upwardly through said opening, the booth and hood to discharge from said exit, a damper valve in the hood for closing off the same, the valve including a pair of hinged closures, a heat sensitive link connecting the closures to hold them in an open position released upon the development of a given temperature in the booth, a spring engaged between the closures to move them to closed positions when the link fuses, and an exhaust duct above the booth receiving said air.

9. Apparatus for facilitating work on an object comprising a booth to be occupied by workmen, means carrying the booth for horizontal movement above the object, the booth including a first unit carried by said means, and a second unit carried by the first unit for vertical movement thereon and including walls in telescopic relation to the first unit defining a work compartment and a work platform in the lower portion of the compartment having an opening giving access to the object, power driven means for moving the second unit vertically on the first unit, and a control responsive to engagement with the object for limiting downward movement of the second unit to prevent the same from directly engaging the object.

10. Apparatus for facilitating work on an object comprising a booth to be occupied by workmen, means carrying the booth for horizontal movement above the object, the booth including a first unit suspended from said means, and a second unit carried by the first unit for vertical movement thereon and including a work platform having an opening giving access to the object and walls extending upwardly beyond the platform in telescopic relation to the first unit and defining a work compartment, means on the booth circulating air upwardly through said opening and compartment, power driven means for moving the second unit vertically relative to the first unit, and a control for limiting downward movement of the second unit to prevent the same from directly engaging the object, said control including an energizing circuit for the power driven means, a normally closed switch in the circuit, and an operating arm for the switch projecting from the underside of said second unit engageable with the object to open the switch.

11. Apparatus for facilitating work on an object comprising a booth to be occupied by workmen, means carrying the booth for horizontal movement above the object, the booth including a first unit suspended from said means, and a second unit carried by the first unit for vertical movement thereon and including a work platform having an opening giving access to the object, and side walls rising from the platform and telescoping around the first unit to define a work compartment, means for circulating air vertically through said opening and compartment, power driven means for moving the second unit vertically, and a control for limiting downward movement of the second unit to prevent the same from directly engaging the object including relay means having an operating part engageable with the object.

12. Apparatus for facilitating work on an object comprising a booth to be occupied by workmen, means carrying the booth for horizontal movement above the object, the booth including a first unit carried by said means, and a second unit carried by the first unit for vertical movement thereon and including a work platform having an opening giving access to the object, power driven means for moving the second unit vertically, an exhaust duct system in the booth, blower means for moving air through the booth and duct system, a damper valve for closing the duct system, releasable means holding the valve open, and a system for simultaneously de-energizing the blower means and releasing said releasable means.

13. In apparatus of the character described; an upper frame, means above the frame carrying the same for horizontal movement, a lower frame, means guiding the lower frame for vertical movement on the upper frame, walls on the lower frame defining a workman's booth, a workman's platform on the lower frame having a downwardly facing work opening, blower means on the upper frame moving air upwardly through said opening and booth, and means carried by the upper frame for moving the lower frame vertically on the upper frame.

14. Apparatus for facilitating work on an airplane comprising, a workman's booth including compartment defining walls, there being an opening in the lower end of the booth for giving access to the airplane, a workman's platform in the booth at said opening, an overhead duct, a blower in the booth for moving air upwardly through said opening and booth into the duct, louver means normally closing the duct to the booth, a member on the booth movable from a retracted position to an active position where it engages and opens the louver means, means operable to actuate the member to the active position, and a control operable to energize the blower and last named means and operable to simultaneously de-energize said last named means and the blower.

15. Apparatus for facilitating work on an airplane comprising, an overhead crane system, a workman's booth carried by the crane system for movement transversely and longitudinally of the airplane, the booth including a platform for the workmen and having an opening in its lower end giving access to the airplane, an elongate overhead duct extending longitudinally of the airplane, normally closed openable louvers for the under side of the duct, a hood in the upper portion of the booth having at its upper end an elongated discharge portion for communicating with the duct when the louvers are open, a blower in the hood for moving air upwardly through the opening, booth and hood into the duct, means on the booth vertically movable into and out of cooperation with the louvers and operable when raised to successively open the louvers as the booth is moved longitudinally along the duct and airplane, and a control operable to simultaneously energize the last mentioned means and the blower and operable to simultaneously de-energize the same.

References Cited in the file of this patent

UNITED STATES PATENTS

| | | |
|---|---|---|
| 928,158 | Smethurst | July 13, 1909 |
| 957,396 | Wedmark | May 10, 1910 |
| 1,114,001 | Ilg | Oct. 20, 1914 |
| 1,619,642 | Ward | Mar. 1, 1927 |
| 1,740,117 | Pinckney | Dec. 17, 1929 |
| 2,137,862 | Steins | Nov. 22, 1938 |
| 2,420,520 | Carsey et al. | May 13, 1947 |
| 2,609,108 | Peterson et al. | Sept. 2, 1952 |
| 2,761,373 | Owen | Sept. 4, 1956 |

FOREIGN PATENTS

| | | |
|---|---|---|
| 507,660 | France | June 20, 1920 |
| 462,135 | Germany | July 5, 1928 |